(12) United States Patent
Takeuchi et al.

(10) Patent No.: US 11,084,946 B2
(45) Date of Patent: Aug. 10, 2021

(54) COMPOSITION CONTAINING FLUORINATED POLYMER AND METHOD FOR PRODUCING FLUORINATED POLYMER FILM-PROVIDED SUBSTRATE

(71) Applicant: AGC Inc., Chiyoda-ku (JP)

(72) Inventors: Tamami Takeuchi, Chiyoda-ku (JP); Shingo Maekawa, Chiyoda-ku (JP); Masahiro Ito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 45 days.

(21) Appl. No.: 16/291,520

(22) Filed: Mar. 4, 2019

(65) Prior Publication Data

US 2019/0194475 A1 Jun. 27, 2019

Related U.S. Application Data

(63) Continuation of application No. PCT/JP2017/035869, filed on Oct. 2, 2017.

(30) Foreign Application Priority Data

Oct. 5, 2016 (JP) .............................. JP2016-197365

(51) Int. Cl.
| | | |
|---|---|---|
| *C09D 147/00* | (2006.01) | |
| *B05D 7/24* | (2006.01) | |
| *C08F 136/16* | (2006.01) | |
| *B05D 1/04* | (2006.01) | |
| *C09D 7/20* | (2018.01) | |
| *C08L 27/12* | (2006.01) | |
| *C09D 201/04* | (2006.01) | |
| *C08K 5/02* | (2006.01) | |
| *C08K 5/05* | (2006.01) | |
| *C08K 5/06* | (2006.01) | |
| *C09D 5/18* | (2006.01) | |

(52) U.S. Cl.
CPC ................ *C09D 5/18* (2013.01); *B05D 1/04* (2013.01); *B05D 7/24* (2013.01); *C08F 136/16* (2013.01); *C08K 5/02* (2013.01); *C08K 5/05* (2013.01); *C08K 5/06* (2013.01); *C08L 27/12* (2013.01); *C09D 7/20* (2018.01); *C09D 147/00* (2013.01); *C09D 201/04* (2013.01)

(58) Field of Classification Search
None
See application file for complete search history.

(56) References Cited

U.S. PATENT DOCUMENTS

| | | | |
|---|---|---|---|
| 5,365,255 A | 11/1994 | Inoue et al. | |
| 5,498,657 A | 3/1996 | Sugiyama et al. | |
| 5,594,479 A | 1/1997 | Inoue et al. | |
| 5,796,415 A | 8/1998 | Inoue et al. | |
| 2008/0275147 A1* | 11/2008 | Tayanagi | H01M 8/1039 521/38 |
| 2009/0029894 A1* | 1/2009 | Okamoto | C11D 11/0047 510/176 |
| 2011/0263785 A1* | 10/2011 | Kashiwagi | H01G 7/023 524/544 |
| 2014/0132111 A1* | 5/2014 | Nakayama | H04R 19/01 310/300 |
| 2016/0164047 A1* | 6/2016 | Komoriya | C09D 5/00 257/40 |

FOREIGN PATENT DOCUMENTS

| | | |
|---|---|---|
| JP | 4-211959 | 8/1992 |
| JP | 7-224242 | 8/1995 |
| JP | 7-238250 | 9/1995 |
| JP | 2001-151970 | 6/2001 |
| WO | WO 2013/129503 A1 | 9/2013 |
| WO | WO 2015/008719 A1 | 1/2015 |
| WO | WO 2015/118983 A1 | 8/2015 |

OTHER PUBLICATIONS

International Search Report dated Dec. 19, 2017 in PCT/JP2017/035869 filed Oct. 2, 2017 (with English Translation).

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

To provide a composition which comprises a fluorinated polymer having an alicyclic ring, from which a film having excellent in-plane uniformity and small surface roughness can be formed by an electrospraying apparatus, and a method for producing a film-provided substrate using the composition. A composition comprising a fluorinated polymer having an alicyclic ring and a solvent, wherein the solvent contains at least one high boiling point solvent having a boiling point of at least 150° C., and the solvent has a dielectric constant of at least 5. And, a method for producing a film-provided substrate, which comprises applying the composition to a substrate by an electrospraying apparatus to form a film containing the fluorinated polymer.

24 Claims, 1 Drawing Sheet

COMPOSITION CONTAINING FLUORINATED POLYMER AND METHOD FOR PRODUCING FLUORINATED POLYMER FILM-PROVIDED SUBSTRATE

TECHNICAL FIELD

The present invention relates to a composition comprising a fluorinated polymer having an alicyclic ring and a solvent, and a method for producing a film-provided substrate using the composition.

BACKGROUND ART

A fluororesin is excellent in heat resistance, chemical resistance, water repellency, weather resistance, electrical insulating properties, optical properties, non-stickiness, low frictional properties, flame retardancy, etc. and by virtue of such characteristics, it is used in various fields such as chemical, electrical/electric, semiconductor, building and automobile fields. For example, by forming a coating film of a fluororesin on the surface of a substrate, the above properties are imparted. As a method of forming a coating film of a fluororesin, a wet method such as a spin coating method, a casting method, a dipping method and a spraying method, and a dry method such as a sputtering method and a vacuum deposition method have been known.

Patent Document 1 proposes method in which using an electrospraying apparatus, a resin solution is applied to a glass sheet being transferred to form a resin coating film on the glass sheet, and discloses as the resin a fluororesin, a polyimide resin, a polyester resin, a polycarbonate resin, etc. In this method, a voltage is applied to between a nozzle to which the resin solution is fed and a counter electrode, and droplets of the charged resin solution are discharged from the tip of the nozzle. The discharged droplets spit by electrostatic repulsion. Such splitting is repeated to form a large number of fine droplets, which are deposited on the surface of a glass sheet on the counter electrode thereby to form a resin coating film.

PRIOR ART DOCUMENTS

Patent Documents

Patent Document 1: WO2015/118983

DISCLOSURE OF INVENTION

Technical Problem

According to studies by the present inventors, if a solution of a fluorinated polymer having an alicyclic ring is applied to the method disclosed in Patent Document 1, the solution will not be discharged from the nozzle, whereby a film cannot be formed, or even if the solution is discharged from the nozzle, the film-forming property tends to be poor, and the resulting coating film has insufficient in-plane uniformity and/or significant surface roughness.

The object of the present invention is to provide a composition containing a fluorinated polymer having an alicyclic ring, capable of forming a film having excellent in-plane uniformity and small surface roughness, by an electrospraying apparatus, and a method for producing a film-provided substrate using the composition.

Solution to Problem

The present invention provides a composition and a method for producing a film-provided substrate, having the following constitutions [1] to [14].

[1] A composition comprising a fluorinated polymer having an alicyclic ring, and a solvent, wherein the solvent is a solvent having a dielectric constant of at least 5 and contains a solvent having a boiling point of at least 150° C.

[2] The composition according to [1], wherein the fluorinated polymer is a fluorinated polymer having an alicyclic ring in its main chain.

[3] The composition according to [2], wherein the fluorinated polymer having an alicyclic ring in its main chain is a fluorinated polymer having units formed by cyclopolymerization of a cyclopolymerizable diene type fluorinated monomer, or a fluorinated polymer having units based on a monomer having a fluorinated alicyclic ring and having a polymerizable double bond between carbon atoms constituting the ring of the alicyclic ring or having a polymerizable double bond between a carbon atom constituting the ring of the alicyclic ring and a carbon atom not constituting the ring.

[4] The composition according to any one of [1] to [3], wherein the solvent comprises at least one fluorinated solvent.

[5] The composition according to any one of [1] to [4], wherein the solvent is a mixed solvent consisting of a mixture of two or more solvents and having a dielectric constant of at least 5, and at least one solvent in the mixed solvent is a solvent having a dielectric constant of less than 5.

[6] The composition according to any one of [1] to [5], wherein the solvent is a mixture of two or more solvents, and at least one solvent in the mixed solvent is a solvent having a boiling point of less than 150° C.

[7] The composition according to any one of [1] to [6], wherein the solvent contains a solvent X which is a perfluoro compound, a solvent Y which is at least one of a hydrofluorocarbon and a hydrofluoroether, and a solvent Z which is a fluorinated alcohol.

[8] The composition according to [7], wherein the solvent X has a boiling point of at least 150° C.

[9] The composition according to [7] or [8], wherein the solvent X is at least one member selected from the group consisting of a perfluorotrialkylamine and a perfluoroalicyclic compound.

[10] The composition according to any one of [7] to [9], wherein the solvent X is at least one member selected from the group consisting of heptacosafluorotributylamine, perfluorotripentylamine, 1,1,2,2,3,3,4,4,4a,4b,5,5,6,6,7,7,8,8,8a,9,9,10,10,10a-tetracosafluorophenanthrene, 1,1,2,2,3,3,4,4,4a,4b,5,5,6,6,7,7,8,8,8a,9,9,9a-docosafluorofluorene and 1,1,2,2,3,3,4,4,4a,5,5,6,6,7,7,8,8a-heptadecafluorodecahydro-8-(trifluoromethyl)naphthalene.

[11] The composition according to any one of [7] to [10], wherein the solvent Y is at least one member selected from the group consisting of 1,1,1,2,2,3,3,4,4,5,5,6,6-tridecafluorohexane, 1,1,1,2,2,3,3,4,4,5,5,6,6-tridecafluorooctane and 1,1,1,2,3,4,4,5,5,5-decafluoro-3-methoxy-2-(trifluoromethyl)pentane.

[12] The composition according to any one of [7] to [11], wherein the solvent Z is at least one member selected from the group consisting of hexafluoro-2-propanol, 2,2,2-trifluoroethanol, 2,2,3,3,3-pentafluoro-1-propanol, 1,1,2,2-tetrafluoroethyl 2,2,2-trifluoroethyl ether, 2,2,3,3-tetrafluoropropanol, 2,2,3,3,4,4,5,5-octafluoro-1-pentanol and 1H,1H,2H,2H-tridecafluoro-1-n-octanol.

[13] The composition according to any one of [7] to [12], wherein to the total content of the solvent X, the solvent Y and the solvent Z, the content of the solvent X is from 35 to 60 mass %, the content of the solvent Y is from 35 to 60 mass %, and the content of the solvent Z is from 5 to 30 mass %.

[14] A method for producing a film-provided substrate, which comprises applying the composition as defined in any one of [7] to [13] to a substrate by an electrospraying apparatus, and removing the solvent to form a film containing the fluorinated polymer.

Advantageous Effects of Invention

According to the composition of the present invention, it is possible to form a film containing a fluorinated polymer having an alicyclic ring, and having excellent in-plane uniformity and small surface roughness, by an electrospraying apparatus.

According to the method for producing a film-provided substrate of the present invention, it is possible to produce a film-provided substrate which has a film containing a fluorinated polymer having an alicyclic ring, and having excellent in-plane uniformity and small surface roughness by an electrospraying apparatus.

DESCRIPTION OF EMBODIMENTS

In this specification, a compound represented by the formula (1) will sometimes be referred to as "compound (1)", and units represented by the formula (1) will sometimes be referred to as "units (1)". The same applies to compounds, units, etc. represented by other formulae.

The "unit" in a polymer means an atomic group derived from one molecule of a monomer, formed by polymerization of the monomer. The units may be units directly formed by polymerization, or may be units having a part of the units converted to another structure by treating the polymer obtained by the polymerization.

[Composition]

The composition of the present invention (hereinafter sometimes referred to as "the present composition") contains a fluorinated polymer having an alicyclic ring (hereinafter sometimes referred to as "fluorinated polymer A") and a specific solvent. The specific solvent in the present composition is a solvent having a dielectric constant of at least 5 and is a solvent containing a solvent having a boiling point of at least 150° C. Hereinafter this specific solvent will sometimes be referred to as "solvent B".

The present composition is typically a liquid composition having the fluorinated polymer A dissolved in the solvent B.

The present composition may further contain as the case requires, within a range not to impair the effects of the present invention, a component other than the fluorinated polymer A and the solvent B.

Further, a film containing the polymer A obtained by applying the present composition to a substrate to form a coating film of the present composition and removing the solvent from the coating film, will be referred to as a "coating film" unless otherwise specified. A film containing the solvent before removal of the solvent will sometimes be referred to a "wet film", and removal of the solvent from the wet film will sometimes be referred to as "drying".

(Fluorinated Polymer A)

The fluorinated polymer A is a substantially linear fluorinated polymer having units based on a monomer having a polymerizable double bond between carbon atoms and having a fluorine atom bonded to a carbon atom. The alicyclic ring which the fluorinated polymer A has may be present in the main chain of the polymer or may be present in a side group.

The fluorinated polymer A is preferably a fluorinated polymer having an alicyclic ring in the main chain, whereby it is easily soluble in the solvent. The "fluorinated polymer having an alicyclic ring in its main chain" means a fluorinated polymer in which at least one of carbon atoms constituting the ring of the alicyclic ring is a carbon atom constituting the main chain of the fluorinated polymer.

The alicyclic ring is a saturated or unsaturated ring having no aromaticity. The alicyclic ring may be a saturated or unsaturated aliphatic hydrocarbon ring in which atoms constituting the ring are all carbon atoms, or may be a saturated or unsaturated aliphatic heterocyclic ring in which atoms constituting the ring are carbon atoms and a hetero atom(s). The hetero atoms may, for example, be an oxygen atom or a nitrogen atom. The alicyclic ring may be monocyclic or polycyclic.

The aliphatic ring is preferably a 4- to 7-membered ring or a condensed ring thereof, particularly preferably a 5- to 6-membered ring or a condensed ring thereof.

The alicyclic ring is preferably a fluorinated alicyclic ring in view of excellent water repellency, oil repellency, transparency, light resistance, chemical resistance, releasability, etc. The fluorinated alicyclic ring is an alicyclic ring having a group having a fluorine atom, or a fluorine atom, bonded to at least one of carbon atoms constituting the ring. The group having a fluorine atom may, for example, be a perfluoroalkyl group, a group having an etheric oxygen atom between carbon atoms of a perfluoroalkyl group, a perfluoroalkoxy group, a group having an etheric oxygen atom between carbon atoms of a perfluoroalkoxy group, or $=CF_2$. A substituent other than the group having a fluorine atom may be bonded to one or more of carbon atoms constituting the ring.

The fluorinated alicyclic ring is preferably a fluorinated alicyclic heterocyclic ring having one or two etheric oxygen atoms as atoms constituting the ring.

The fluorinated alicyclic ring preferably contains no carbon-hydrogen bond. That is, it is preferably a perfluoroalicyclic ring in which all the hydrogen atoms bonded to carbon atoms constituting the alicyclic ring are substituted by a substituent having a fluorine atom and having no carbon-hydrogen bond or by a fluorine atom.

Accordingly, the fluorinated alicyclic ring is particularly preferably a perfluoroalicyclic ring having one or two etheric oxygen atoms as atoms constituting the ring.

The fluorinated polymer A may have, at its main chain terminal or in its side groups, a reactive functional group such as a carboxy group, an acid halide group, an alkoxycarbonyl group, a carbonyloxy group, a carbonate group, a sulfo group, a phosphono group, a hydroxy group, a thiol group, a silanol group or an alkoxy silyl group.

The fluorinated polymer A is preferably a fluorinated polymer having units formed by cyclopolymerization of a diene type fluorinated monomer (hereinafter sometimes referred to as "polymer (A1)") or a fluorinated polymer having units based on a cyclic fluorinated monomer (hereinafter sometimes referred to as "polymer (A2)"), particularly preferably the polymer (A1). The cyclic fluorinated monomer is preferably a monomer having a fluorinated alicyclic ring and having a polymerizable double bond between carbon atoms constituting the ring of the alicyclic ring, or a monomer having a polymerizable double bond between a carbon atom constituting the ring of the fluorinated alicyclic ring and a carbon atom not constituting the ring.

Further, the polymer (A1) and the polymer (A2) are preferably a perfluoropolymer, that is, a polymer such that hydrogen atoms bonded to carbon atoms in all the units in the polymer are substituted by fluorine atoms.

<Polymer (A1)>

The diene type fluorinated monomer is a monomer having two polymerizable double bonds, and fluorine atoms. The polymerizable double bond may be a carbon-carbon double bond in e.g. a vinyl group, an allyl group, an acryloyl group, a methacryloyl group, or a group having one or more or all of hydrogen atoms bonded to carbon atoms of such a group substituted by a fluorine atom(s).

The diene type fluorinated monomer is preferably the following compound (m1).

$$CF_2=CF-Q-CF=CF_2 \qquad (m1)$$

wherein Q is a perfluoroalkylene group which may have an etheric oxygen atom and in which one or more of fluorine atoms may be substituted by a halogen atom other than fluorine atoms.

As the units formed by cyclopolymerization of the compound (m1), the following units (1-1) to (1-4) may, for example, be mentioned.

The number of carbon atoms in the perfluoroalkylene group as Q is preferably from 1 to 6, more preferably from 1 to 5, particularly preferably from 1 to 3. The perfluoroalkylene group may be linear or branched, and is preferably linear.

The halogen atom other than fluorine atom may, for example, be a chlorine atom or a bromine atom.

Q is preferably a perfluoroalkylene group having an etheric oxygen atom. Such a group may, for example, be a group having an etheric oxygen atom at one terminal of the perfluoroalkylene group, a group having an etheric oxygen atom at each terminal of the perfluoroalkylene group, or a group having an etheric oxygen atom between carbon atoms of the perfluoroalkylene group. However, in a case where the perfluoroalkylene group has an etheric oxygen atom between carbon atoms, the number of carbon atoms of such a perfluoroalkylene group is 2 or more, and the preferred upper limit is as mentioned above. Q is preferably a group having an etheric oxygen atom at one terminal of the perfluoroalkylene group, in view of cyclopolymerizability.

As specific examples of the compound (m1), the following compounds may be mentioned.

$CF_2=CFOCF_2CF=CF_2$, $CF_2=CFOCF(CF_3)CF=CF_2$, $CF_2=CFOCF_2CF_2CF=CF_2$, $CF_2=CFOCF_2CF(CF_3)CF=CF_2$, $CF_2=CFOCF(CF_3)CF_2CF=CF_2$, $CF_2=CFOCFClCF_2CF=CF_2$, $CF_2=CFOCCl_2CF_2CF=CF_2$, $CF_2=CFOCF_2OCF=CF_2$, $CF_2=CFOC(CF_3)_2OCF=CF_2$, $CF_2=CFOCF_2CF(OCF_3)CF=CF_2$, $CF_2=CCF_2CF=CF_2$, $CF_2=CFCF_2CF_2CF=CF_2$, $CF_2=CFCF_2OCF_2CF=CF_2$.

The compound (m1) is preferably, $CF_2=CFOCF_2CF=CF_2$, $CF_2=CFOCF_2CF_2CF=CF_2$ or $CF_2=CFOC(CF_3)_2OCF=CF_2$, particularly preferably $CF_2=CFOCF_2CF_2CF=CF_2$.

The polymer (A1) may further have units other than the units formed by cyclopolymerization of the diene type fluorinated monomer.

Other units are not particularly limited so long as they are units based on a monomer copolymerizable with the diene type fluorinated monomer. Such a monomer may, for example, be a fluorinated olefin such as tetrafluoroethylene or chlorotrifluoroethylene, a fluorinated vinyl ether such as perfluoro(methyl vinyl ether), or a monomer having a reactive functional group. The monomer having a reactive functional group may be a monomer having a polymerizable double bond and a reactive functional group. The polymerizable double bond may, for example, be $CF_2=CF-$, $CF_2=CH-$, $CH_2=CF-$, $CFH=CF-$, $CFH=CH-$, $CF_2=C-$ or $CF=CF-$. The reactive functional group may be as defined above.

The monomer copolymerizable with the diene type fluorinated monomer is preferably a perfluoromonomer.

In the polymer (A1), the proportion of units formed by cyclopolymerization of the diene type fluorinated monomer is preferably at least 50 mol %, more preferably at least 75 mol %, particularly preferably 100 mol %, to all the units constituting the polymer (A1).

The polymer (A1) may have a reactive functional group at its main chain terminal. The reactive functional group may be as mentioned above.

<Polymer (A2)>

The cyclic fluorinated monomer may, for example, be a monomer containing a fluorinated alicyclic ring and having a polymerizable double bond between carbon atoms constituting the ring of the fluorinated alicyclic ring, or a monomer containing a fluorinated alicyclic ring and a carbon atom present out of the fluorinated alicyclic ring, and having a polymerizable double bond between a carbon atom constituting the ring of the fluorinated alicyclic ring and a carbon atom not constituting the ring.

The cyclic fluorinated monomer is preferably the following compound (m2) or compound (m3):

(m3)

wherein $X^1$, $X^2$, $X^3$, $X^4$, $Y^1$ and $Y^2$ are each independently a fluorine atom, a perfluoroalkyl group, a group having an etheric oxygen atom between carbon atoms of a perfluoroalkyl group, a perfluoroalkoxy group, or a group having an etheric oxygen atom between carbon atoms of a perfluoroalkoxy group, and $X^3$ and $X^4$ may be mutually bonded to form a ring.

The unit based on the compound (m2) is the following unit (2), and the unit based on the compound (m3) is the following unit (3):

The number of carbon atoms in the perfluoroalkyl group as $X^1$, $X^2$, $X^3$, $X^4$, $Y^1$ and $Y^2$ is preferably from 1 to 7, more preferably from 1 to 5, particularly preferably from 1 to 4. The perfluoroalkyl group is preferably linear or branched, particularly preferably linear. The perfluoroalkyl group is preferably a trifluoromethyl group, a pentafluoroethyl group or a heptafluoropropyl group, particularly preferably a trifluoromethyl group.

The perfluoroalkoxy group may be one having an oxygen atom bonded to the perfluoroalkyl group, particularly preferably a trifluoromethoxy group.

In a case where the perfluoroalkyl group or the perfluoroalkoxy group has at least 2 carbon atoms, it may have an etheric oxygen atom between carbon atoms.

$X^1$ is preferably a fluorine atom.

$X^2$ is preferably a fluorine atom, a trifluoromethyl group or a $C_{1-4}$ perfluoroalkoxy group, particularly preferably a fluorine atom or a trifluoromethoxy group.

$X^3$ and $X^4$ are each independently preferably a fluorine atom or a $C_{1-4}$ perfluoroalkyl group, particularly preferably a fluorine atom or a trifluoromethyl group.

In a case where $X^3$ and $X^4$ are usually bonded to form a ring, the number of atoms constituting the ring is preferably from 4 to 7, more preferably from 5 to 6.

$Y^1$ and $Y^2$ are each independently preferably a fluorine atom, a $C_{1-4}$ perfluoroalkyl group or a $C_{1-4}$ perfluoroalkoxy group, particularly preferably a fluorine atom or a trifluoromethyl group.

As specific examples of the compound (m2), compounds (m21) to (m25) may be mentioned.

As specific examples of the compound (m3), compounds (m31) to (m32) may be mentioned.

(m21)

(m22)

(m23)

(m24)

(m25)

(m31)

(m32)

The polymer (A2) may further have units other than the units based on the cyclic fluorinated monomer. Other units are not particularly limited so long as they are based on a monomer copolymerizable with the cyclic fluorinated monomer. Such a monomer may, for example, be a fluorinated olefin, a fluorinated vinyl ether, a diene type fluorinated monomer, or a monomer having a reactive functional group. Such monomers may be respectively as mentioned above.

Other units are preferably units based on a perfluoromonomer such as a perfluoroolefin such as tetrafluoroethylene or a fluorinated vinyl ether such as perfluoro(methyl vinyl ether).

The polymer (A2) is particularly preferably a copolymer of units based on the cyclic fluorinated monomer and tetrafluoroethylene.

The copolymer having units based on the cyclic fluorinated monomer and units formed by cyclopolymerization of the diene type fluorinated monomer is considered as the polymer (A2).

In the polymer (A2), the proportion of the units based on the cyclic fluorinated monomer is preferably at least 20 mol %, more preferably at least 40 mol %, and may be 100 mol %, to all the units constituting the polymer (A2).

The polymer (A2) may have a reactive functional group at its main chain terminal. The reactive functional group may be as mentioned above.

The mass average molecular weight of the fluorinated polymer A is preferably from 50,000 to 1,000,000, particularly preferably from 50,000 to 300,000. When the mass average molecular weight of the fluorinated polymer A is at least the lower limit value of the above range, more excellent film strength will be obtained. When the mass average molecular weight of the fluorinated polymer A is at most the upper limit value of the above range, more excellent film-forming property will be obtained.

The mass average molecular weight of the fluorinated polymer is a value as calculated as standard polystyrene measured by gel permeation chromatography.

The fluorinated polymer A may be produced by a known production method or may be a commercial product. As a commercially available fluorinated polymer A, for example, CYTOP (registered trademark, manufactured by Asahi Glass Company, Limited), Teflon AF (registered trademark, manufactured by Du Pont-Mitsui Fluorochemicals Co., Ltd.) and Hyflon AD (registered trademark, manufactured by SOLVAY) may be mentioned.

(Solvent B)

The solvent B has a dielectric constant of at least 5, preferably at least 6, particularly preferably at least 7. When the dielectric constant of the solvent B is at least the above lower limit value, the present composition can be stably discharged from a nozzle of an electrospraying apparatus (the present composition is excellent in discharge property).

In a case where the solvent B is composed of one solvent, the dielectric constant of the solvent is at least 5.

In a case where the solvent B is composed of two or more solvents, in order that the dielectric constant of the solvent B is at least 5, the solvent B at least contains a solvent having a dielectric constant of at least 5 (hereinafter sometimes referred to as "high dielectric constant solvent"). The solvent B may further contain, as the case requires, a solvent having a dielectric constant of less than 5 (hereinafter sometimes referred to as "low dielectric constant solvent") within a range where the solvent B as a whole has a dielectric constant of at least 5.

The dielectric constant may be measured by parallel-plate capacitor method.

The dielectric constant of the solvent B is preferably at most 10, particularly preferably at most 8. The dielectric constant is preferably as high as possible in view of excellent discharge property, however, the polarity tends to be high as the dielectric constant becomes high. If the polarity becomes high, the solubility of the fluorinated polymer A tends to be low. When the dielectric constant is at most the above upper limit value, solubility of the fluorinated polymer A tends to be secured.

The solvent B contains at least one solvent having a boiling point of at least 150° C. (hereinafter sometimes referred to as "high boiling point solvent"). While droplets discharged from a nozzle of an electrospraying apparatus are deposited on a substrate, volatilization of the solvent B contained in the droplets proceeds, however, the high boiling point solvent is hardly volatilized. When the solvent B contains a high boiling point solvent, the droplets having the solvent sufficiently remaining are deposited on the substrate and leveled to obtain a coating film having excellent in-plane uniformity and small surface roughness. From such a viewpoint, the boiling point of the high boiling point solvent is preferably at least 170° C.

The upper limit of the boiling point of the high boiling point solvent is not particularly limited, and is preferably 250° C., particularly preferably 200° C., with a view to shortening the drying time.

The high boiling point solvent may be a high dielectric constant solvent or may be a low dielectric constant solvent.

The high boiling point solvent is typically a solvent in which the fluorinated polymer A is soluble, whereby precipitation of the fluorinated polymer A in the droplets can be suppressed until the droplets of the present composition discharged from the nozzle of the electrospraying apparatus are deposited on the substrate. If the fluorinated polymer A is precipitated, the droplets will not sufficiently be leveled, and the resulting coating film may have insufficient in-plane uniformity and large surface roughness.

The high boiling point solvent is preferably a fluorinated solvent having a fluorine atom content of at least 70 mass % in view of solubility of the fluorinated polymer A.

The fluorine atom content (hereinafter sometimes referred to as "F content") of the solvent is obtained from the following formula.

$$F\ content = \text{number of fluorine atoms in molecule} \times 19 / \text{molecular weight} \times 100$$

The solvent B may further contain a solvent other than the high boiling point solvent (that is, a solvent having a boiling point of less than 150° C.).

The content of the high boiling point solvent in the solvent B is preferably at least 35 mass % to the total mass of the solvent B. When the content of the high boiling point solvent is at least the above lower limit value, droplets containing a larger amount of the solvent are deposited on the substrate, whereby the resulting coating film tends to have more excellent in-plane uniformity and smaller surface roughness.

Further, the content of the high boiling point solvent in the solvent B is preferably at most 95 mass %, more preferably at most 60 mass %, further preferably at most 52 mass %, particularly preferably at most 40 mass %, to the total mass of the solvent B. When the content of the high boiling point solvent is at most the above upper limit value, the present composition tends to be more excellent in the discharge stability.

Accordingly, the content of the high boiling point solvent in the solvent B is preferably from 35 to 95 mass %, more preferably from 35 to 60 mass %, further preferably from 35 to 52 mass %, particularly preferably from 35 to 40 mass %, to the total mass of the solvent.

The surface tension of the solvent B is preferably from 15 to 17 mN/m, particularly preferably from 15 to 16 mN/m. When the surface tension is within the above range, the present composition will be more excellent in the discharge stability.

The surface tension of the solvent (B) is the surface tension of the solvent (B) as a whole, in the same manner as the dielectric constant.

The surface tension is measured by a plate method.

The vapor pressure of the solvent B at 20° C. is preferably from 5,000 to 8,000 Pa, particularly preferably from 5,000 to 7,500 Pa. When the vapor pressure is at least the lower limit value of the above range, the present composition will be more excellent in the discharge stability. When the vapor pressure is at most the upper limit value of the above range, the resulting coating film will be excellent in the in-plane uniformity and will have small surface roughness.

The vapor pressure of the solvent B is the vapor pressure of the solvent (B) as a whole in the same manner as the dielectric constant.

The vapor pressure of a single solvent is measured by static method. The vapor pressure of a mixed solvent is obtained by Raoult's law from the vapor pressures of the respective single solvents.

The viscosity of the solvent B at 25° C. is preferably from 2.0 to 20 mPa·s, particularly preferably from 2.7 to 11 mPa·s. When the viscosity is at least the lower limit value of the above range, the present composition will be more excellent in the film-forming property. When the viscosity is at most the upper limit value of the above range, the present composition will be excellent in the discharge stability. Further, the nozzle is less likely to be clogged.

The viscosity of the solvent (B) is a value measured by a cone plate viscometer.

As a high boiling point solvent in which solubility of the fluorinated polymer A is high, a fluorinated solvent having a F content of at least 70 mass % is preferred, and such a high boiling point solvent having a high F content is usually a low dielectric constant solvent. Whereas, in a high dielectric constant solvent, the solubility of the fluorinated polymer A is usually low, and if fluorine atoms are introduced to increase the F content so as to increase the solubility of the fluorinated polymer A, the dielectric constant tends to decrease. Further, the boiling point of a high dielectric constant solvent having fluorine atoms is less than 150° C. in many cases.

Accordingly, considering the solubility of the fluorinated polymer A, the solvent B is preferably a mixture of a high boiling point solvent having a high F content and a high dielectric constant solvent. Further, considering the solubility of the fluorinated polymer A, a solvent other than the high boiling point solvent (e.g. a high dielectric constant solvent) is also preferably a fluorinated solvent.

That is, the solvent B is preferably a mixture of a high dielectric constant solvent which is a solvent having a boiling point of less than 150° C., and a high boiling point solvent, preferably a mixture of a high boiling point solvent which is a low dielectric constant solvent, and a high dielectric constant solvent, and all these solvents are preferably fluorinated solvents.

Further, in a case where both the high boiling point solvent and the high dielectric constant solvent are fluorinated solvents differing in the F content, compatibility of them may be insufficient in some cases. In such a case, in order to increase the compatibility of them, the solvent B preferably contains a third fluorinated solvent having high compatibility with both the solvents.

The solvent B preferably contains a solvent X which a perfluoro compound, a solvent Y which is at least one of a hydrofluorocarbon (hereinafter sometimes referred to as "HFC") and a hydrofluoroether (hereinafter sometimes referred to as "HFE"), and a solvent Z which is a fluorinated alcohol.

The solvent X is a perfluoro compound and has a high F content, whereby the solubility of the fluorinated polymer A in it is high, and when the solvent B contains the solvent X, the fluorinated polymer A can be well dissolved. On the other hand, the solvent X tends to have low polarity and a low dielectric constant. The solvent Z tends to have high polarity and a high dielectric constant as compared with the solvent X, and usually has a dielectric constant of higher than 5. Accordingly, when the solvent B contains the solvent Z, the solvent B tends to have a dielectric constant of at least 5. Since the solvent Y is a fluorocompound containing hydrogen atoms, it has favorable compatibility with both the solvent X and the solvent Z. Accordingly, when the solvent B contains the solvent Y, the solvent X and the solvent Z become compatible with each other, and the uniformity of the solvent B can be thereby improved.

At least one of the solvent X, the solvent Y and the solvent Z is preferably a high boiling point solvent.

Since the high boiling point solvent is preferably a solvent in which the fluorinated polymer A is soluble, it is preferred that at least one of the solvent X and the solvent Y is a high boiling point solvent, and it is particularly preferred that the solvent X is a high boiling point solvent.

The F content of the solvent X is preferably from 70 to 90 mass %, more preferably from 72 to 90 mass %, particularly preferably from 75 to 90 mass %. When the F content is at least the lower limit value of the above range, excellent solubility of the fluorinated polymer A and compatibility with other solvent will be obtained.

The dielectric constant of the solvent X is not particularly limited and may, for example, be from 1.5 to 2.5.

The solvent X may, for example, be a perfluorotrialkylamine or a perfluoroalicyclic compound. The number of carbon atoms of the alkyl group (perfluoroalkyl group) in the perfluorotrialkylamine is preferably from 10 to 15. The perfluoroalicyclic compound is a perfluoro compound having an alicyclic ring. The alicyclic ring may be as mentioned above, provided that the alicyclic ring in the perfluoroalicyclic compound is a perfluoroalicyclic ring.

As specific examples of the solvent X, the following solvents may be mentioned.

A perfluorotrialkylamine such as heptacosafluorotributylamine (F content: 76.4 mass %, dielectric constant: 1.94, boiling point: 174° C.) or perfluorotripentylamine (F content: 76.4 mass %, dielectric constant: 1.98, boiling point: 215° C.); or a perfluoroalicyclic compound such as a perfluoro compound such as 1,1,2,2,3,3,4,4,4a,4b,5,5,6,6,7,7,8,8,8a,9,9,10,10,10a-tetracosafluorophenanthrene (F content: 73.1 mass %, dielectric constant: 2.01, boiling point: 215° C.), 1,1,2,2,3,3,4,4,4a,4b,5,5,6,6,7,7,8,8,8a,9,9,9a-docosafluorofluorene (F content: 72.8 mass %, dielectric constant: 1.99, boiling point: 194° C.) or 1,1,2,2,3,3,4,4,4a,5,5,6,6,7,7,8,8a-heptadecafluorodecahydro-8-(trifluoromethyl)naphthalene (F content: 74.2 mass %, dielectric constant: 1.97, boiling point: 160° C.).

These solvents may be used alone or in combination of two or more.

The solvent X is particularly preferably heptacosafluorotributylamine, which has a moderate boiling point.

The F content of the solvent Y is preferably from 70 to 75 mass %. When the F content is within the above range, the solvent Y is excellent in the compatibility with the solvent X and the solvent Z.

The dielectric constant of the solvent Y is not particularly limited and may, for example, be from 6 to 10.

As specific examples of the solvent Y, the following solvents may be mentioned.

HFC such as 1,1,1,2,2,3,3,4,4,5,5,6,6-tridecafluorohexane (ASAHIKLIN (registered trademark) AC2000, manufactured by Asahi Glass Company, Limited, F content: 77.2 mass %, dielectric constant: 3.31, boiling point: 70.8° C.) or 1,1,1,2,2,3,3,4,4,5,5,6,6-tridecafluorooctane (ASAHIKLIN (registered trademark) AC6000, manufactured by Asahi Glass Company, Limited, F content: 70.9 mass %, dielectric constant: 5.1, boiling point: 114.7° C.); or HFE such as 1,1,1,2,3,4,4,5,5,5-decafluoro-3-methoxy-2-(trifluoromethyl)pentane (F content: 70.5 mass %, dielectric constant: 6.12, boiling point: 98° C.).

These solvents may be used alone or in combination of two or more.

The solvent Y is particularly preferably 1,1,1,2,3,4,4,5,5,5-decafluoro-3-methoxy-2-(trifluoromethyl)pentane, which has a dielectric constant of at least 6.

The F content of the solvent Z is preferably from 55 to 70 mass %.

The dielectric constant of the solvent Z is preferably from 15 to 30, particularly preferably from 18 to 30.

As specific examples of the solvent Z, the following solvents may be mentioned.

A fluorinated alcohol such as hexafluoro-2-propanol (F content: 67.8 mass %, dielectric constant: 18.3, boiling point: 59° C.), 2,2,2-trifluoroethanol (F content: 57.0 mass %, dielectric constant: 26.9, boiling point: 73.6° C.), 2,2,3,3,3-pentafluoro-1-propanol (F content: 63.3 mass %, dielectric constant: 18.7, boiling point: 81° C.), 1,1,2,2-tetrafluoroethyl 2,2,2-trifluoroethyl ether (ASAHIKLIN AE3000, manufactured by Asahi Glass Company, Limited, F content: 66.5 mass %, dielectric constant: 6.69, boiling point: 56° C.), 2,2,3,3-tetrafluoropropanol (F content: 57.5 mass %, dielectric constant: 21.2, boiling point: 108° C.), 2,2,3,3,4,4,5,5-octafluoro-1-pentanol (F content: 65.5 mass %, dielectric constant: 15.78, boiling point: 140° C.) or 1H, 1H, 2H, 2H-tridecafluoro-1-n-octanol (F content: 67.8 mass %, dielectric constant: 8.92, boiling point: 180° C.).

These solvents may be used alone or in combination of two or more.

The solvent Z is particularly preferably hexafluoro-2-propanol, which is excellent in compatibility with the fluorinated polymer A, which has a moderate vapor pressure, and which can provide a nonflammable solution.

The solvent B containing the solvent X, the solvent Y and the solvent Z preferably has, to the total amount of the solvent X, the solvent Y and the solvent Z, a content of the solvent X of from 35 to 60 mass %, a content of the solvent Y of from 35 to 60 mass % and a content of the solvent Z of from 5 to 30 mass %, more preferably a content of the solvent X of from 35 to 52 mass %, a content of the solvent Y of from 35 to 57 mass % and a content of the solvent Z of from 8 to 30 mass %, particularly preferably a content of the solvent X of from 35 to 40 mass %, a content of the solvent Y of from 35 to 55 mass % and a content of the solvent Z of from 10 to 30 mass %.

(Preferred Composition of the Present Composition)

The content of the fluorinated polymer A in the present composition is preferably at least 50 mass %, more preferably at least 70 mass %, particularly preferably at least 80 mass %, and may be 100 mass %, to the solid content (100 mass %) of the present composition. When the content of the fluorinated polymer A is at least the lower limit value of the above range, the coating film to be formed is more excellent in heat resistance, chemical resistance, water repellency, weather resistance, electrical insulating property, optical properties, non-stickiness, low frictional properties, flame retardancy, etc.

The content of the solvent B in the present composition is preferably such that the solid content concentration of the present composition is from 0.1 to 5 mass %. The solid content concentration of the present composition is more preferably from 0.5 to 5 mass %, particularly preferably from 0.5 to 2 mass %. In a case where the fluorinated polymer A to the solid content is 100 mass %, the content of the fluorinated polymer A in the present composition is preferably from 0.1 to 5 mass %, more preferably from 0.5 to 5 mass %, particularly preferably from 0.5 to 2 mass %. When the solid content concentration is at least the lower limit value of the above range, the present composition is more excellent in film-forming properties. When the solid content concentration is at most the upper limit value of the above range, the present composition is more excellent in discharge stability.

The solid content of the present composition represents the total amount of components other than the solvent B in the present composition (the amount having the mass of the solvent B removed from the total mass of the present composition), and the solid content concentration is obtained from the following formula.

Solid content concentration [mass %]=total mass of components other than the solvent B/total mass of the present composition x 100

The solid content of the present composition may also be obtained as a residue obtained after 1.0 g of the present composition put in an aluminum cup is dried in an oven at 180° C. for 180 minutes.

Advantageous Effects

The present composition contains the fluorinated polymer A and the solvent B. The solvent B contains at least one high boiling point solvent having a boiling point of at least 150° C. and has a dielectric constant of at least 5. Accordingly, by the present composition containing the fluorinated polymer A, a coating film having excellent in-plane uniformity and small surface roughness can be formed by an electrospraying apparatus.

Since the solvent B has a dielectric constant of at least 5, the present composition can be stably discharged from a nozzle of an electrospraying apparatus, whereby a coating film can be formed on a substrate. Further, droplets of the present composition discharged are deposited on the substrate in a state where the solvent sufficiently remains and are excellent in leveling property. Accordingly, the resulting coating film is excellent in in-plane uniformity and has small surface roughness.

In a case where the solvent B contains the solvents X to Z, the above effects will be particularly excellent.

Here, the fluorinated solvent tends to be negatively charged. In an electrospraying apparatus, details of which will be described later, the solution is positively charged when the solution to be applied is discharged from the nozzle, and accordingly, it was expected that the fluorinated solvent is not suitable as a solvent of the solution to be applied by an electrospraying apparatus. However, according to studies by the present inventors, unexpectedly, it was found that the composition can be favorably discharged from a nozzle of an electrospraying apparatus when the solvents X, Y and Z which are fluorinated solvents are used and the dielectric constant of the solvent B as a whole is at least 5.

[Method for Producing Film-Provided Substrate]

The method for producing a film-provided substrate of the present invention (hereinafter sometimes referred to as "the present production method") comprises a step (film-forming step) of applying the present composition to a substrate by using an electrospraying apparatus to form (film-form) a film containing the fluorinated polymer A.

The present production method is a method utilizing so-called electrospray deposition method.

Now, the present production method will be described in further detail with reference to embodiments.

(Electrospraying Apparatus)

Figure 1:
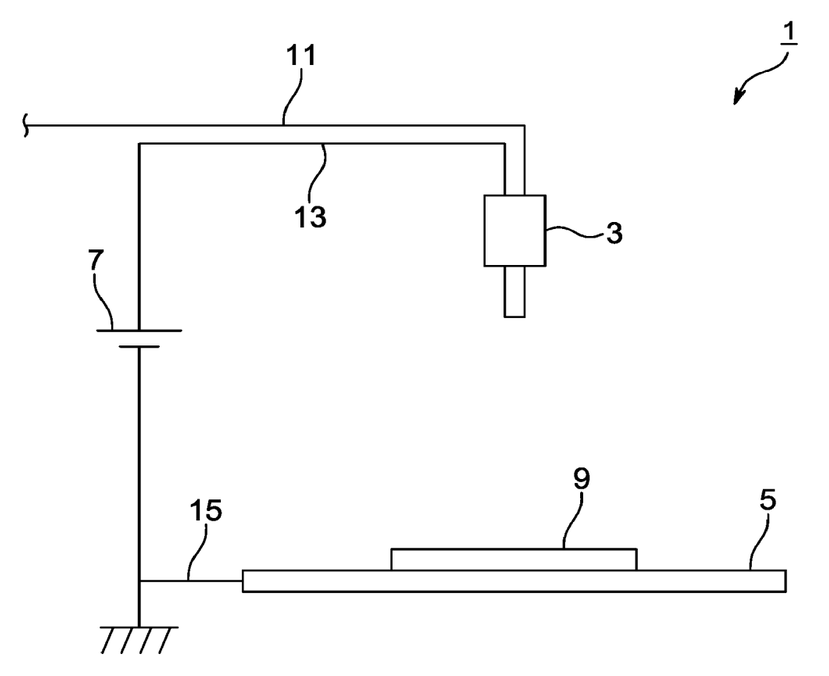
The Figure is a drawing schematically illustrating an example of an electrospraying apparatus.

The Figure is a drawing schematically illustrating an example of an electrospraying apparatus used in the present embodiment. An electrospraying apparatus 1 in this example comprises a nozzle 3, a counter electrode 5 and a power source 7.

The nozzle 3 is disposed so that the tip side faces downward in the gravity direction.

The counter electrode 5 is a plate-shape member formed from an electrically conductive material (such as a metal). The counter electrode 5 is disposed below (on the tip side of) the nozzle 3 apart from the tip of the nozzle 1.

The distance between the nozzle 3 and the counter electrode 5 is set in accordance with the distance between the tip of the nozzle 3 and a substrate 9 disposed on (the nozzle 3 side of) the counter electrode 5.

To the nozzle 3, a supply pipe 11 so as to supply the present composition to the nozzle 3 is connected. Further, the nozzle 3 is connected to a positive electrode of the power source 7 via a cable 13, and the counter electrode 5 is connected to a negative electrode of the power source 7 and is grounded via a cable 15. By such a constitution, the present composition is supplied to the nozzle 3, and a voltage generated by the power source 7 is applied to between the nozzle 3 and the counter electrode 5.

(Substrate)

The material of the substrate 9 is not particularly limited, and the substrate 9 may have a single layer structure or may have a multilayer structure. The substrate having a single layer structure may, for example, be a substrate of e.g. glass, sapphire, quartz or silicon wafer, a resin sheet or film of e.g. a cycloolefin polymer (COP), polyimide (PI), polycarbonate (PC), polyethylene naphthalate (PEN), polyethylene terephthalate (PET), polymethyl methacrylate (PMMA), polystyrene (PS), polyethylene (PE), polypropylene (PP) or polyamide, or a metal substrate of e.g. nickel, copper, stainless steel (SUS), silver or aluminum. The substrate having a multilayer structure may, for example, be a substrate having an organic material (such as parylene) or an inorganic material (such as a metal film) laminated on the substrate having a single layer structure by laminating, coating, vapor deposition or the like.

The thickness of the substrate 9 is not particularly limited and may be properly set depending upon e.g. the material of the substrate 9. For example, the thickness is preferably from 100 μm to 5 mm in the case of a glass substrate, and the thickness is preferably from 1 μm to 500 μm in the case of a resin film. In the case of a substrate having a multilayer structure, the thickness of the layer of the organic material or the inorganic material laminated on the substrate is, for example, preferably from 10 nm to 100 μm.

The shape of the substrate 9 is not limited to a sheet-shape as shown in the Figure, and may be three-dimensional. The three-dimensional shape may, for example, be a curved substrate (bottle shape), a patterned substrate (moth eye structure, organic TFT (thin film transistor) substrate) or other irregular substrate or fibrous substance (such as non-woven fabric).

(Film-Forming Step)

In the film-forming step according to this embodiment, first, the present composition is applied to the substrate 9 by using the electrospraying apparatus 10. In the electrospraying apparatus 10, application of the present composition is carried out as follows.

The substrate 9 is placed on the counter electrode 5. The present composition is supplied to the nozzle 3 via the supply pipe 11, and a voltage of several thousands to several tens of thousands is applied to between the nozzle 3 and the counter electrode 5 by the power source 7.

By application of a voltage in such a manner, a strong electric field is generated at the tip of the nozzle 3 by an electric field concentration effect, the liquid level of the present composition at the tip of the nozzle 3 is charged, and a conical meniscus called Taylor-cone is formed by the interaction with the electric field. As the electric field becomes stronger, the electrostatic repulsion at the liquid level increases. When the electrostatic repulsion at the liquid level exceeds the surface tension, droplets called jet are sprayed from the tip of the Taylor-cone. The sprayed droplets are all negatively charged, and the charged droplets spit by the electrostatic repulsion and refined. Since the size of the droplets are very small, volatilization of the solvent contained in the droplets proceed, the charge density of the droplets increases, and further splitting of the split droplets is repeated and refinement of the droplets proceeds, in a short time. The refined droplets are led by an electric field formed between the nozzle 3 and the counter electrode 5 and are deposited on the substrate 9 on the counter electrode 5.

In such a manner, the present composition is applied to the substrate 9, whereby a wet film is formed. The solvent contained in the wet film is a solvent after a part of the solvent B contained in the present composition is volatilized.

By drying the formed wet film, the fluorinated polymer A is precipitated along with volatilization of the solvent, whereby a coating film is formed.

The film-forming conditions such as the voltage applied to the nozzle 3, the distance between the tip of the nozzle 3 and the substrate 9, and the supply rate of the present composition to the nozzle 3 are properly set depending upon e.g. the size (film-forming range) of the substrate 9, the thickness of the coating film to be formed, etc.

The voltage applied to the nozzle 3 (potential difference between the nozzle 3 and the counter electrode 5) influences the spray mode of the droplets from the nozzle 3. The spray mode influences the deposit state of the droplets on the substrate 9.

The spray mode may be a single jet mode in which one jet of droplets is discharged from the nozzle 3 and a multi jet mode in which a plurality of jets of droplets are discharged from the nozzle 3. In the single jet mode, a deposit is formed on the substrate 9. In the multi jet mode, a plurality of deposits in accordance with the number of jets are formed on the substrate 9. The deposit is in a substantially circular form, and as the number of the jets increases, the deposits tend to be small.

As the voltage is increased, the mode changes from the single jet mode to the multi jet mode. The voltage is further increased, the discharge angle of a plurality of jets of droplets from the nozzle 3 (the angle relative to the axis direction of the nozzle 3) increases, and the distance between a plurality of deposits tends to be long.

The voltage is preferably a voltage in the vicinity of a voltage at which the single jet mode and the multi jet mode switch, in order that a continuous film is formed in a range as wide as possible on the substrate 9.

The larger the voltage area in which the continuous film is to be formed, the more stably the application may be conducted. As the dielectric constant of the solvent (B) in the present composition is higher, the voltage range in which the continuous film is to be formed tends to be large.

The voltage applied to the nozzle 3 may be properly set considering the above points and is not particularly limited, and is, for example, preferably from 5 to 30 kV, more preferably from 5 to 25 kV, particularly preferably from 10 to 20 kV. When the voltage is at least the lower limit value of the above range, the area on which the present composition is applied on the substrate 9 can be sufficiently large, and more excellent productivity of the coating film will be achieved. When the voltage is at most the upper limit value of the above range, the present composition is less likely to be unevenly applied to the substrate 9, and a coating film having excellent in-plane uniformity tends to be obtained.

The longer the distance between the tip of the nozzle 3 and the substrate 9, the higher the voltage at which the single jet mode and the multi jet mode switch, and the lower the electric field strength. The shorter the distance between the tip of the nozzle 3 and the substrate 9, the narrower the range in which the present composition is applied on the substrate 9.

The distance between the tip of the nozzle 3 and the substrate 9 may be properly set considering the above points and is not particularly limited, and is, for example, preferably from 10 to 200 mm, more preferably from 30 to 200 mm, particularly preferably from 50 to 150 mm. When the distance is at least the lower limit value of the above range, the area on which the present composition is applied on the substrate 9 will be sufficiently large, and more excellent productivity of the coating film will be achieved. When the distance is at most the upper limit value of the above range, the present composition is less likely to be unevenly applied to the substrate 9, and a coating film having excellent in-plane uniformity is likely to be obtained. Further, the solvent will not excessively volatilize until the droplets of the present composition are deposited on the substrate 9, the fluorinated polymer A will hardly be precipitated and the leveling of the droplets will hardly be insufficient, and a coating film having a small surface roughness tends to be obtained.

The supply rate of the present composition to the nozzle 3 and the voltage at which the mode is a spray mode in which a continuous film is formed on the substrate 9 (single jet mode to multi jet mode) are in proportion to each other. For example, if the spray rate is lowered, the longer the distance between the tip and the substrate 9, the higher the voltage at which the single jet mode and the multi jet mode switch, and the lower the electric field strength. The shorter the distance between the tip of the nozzle 3 and the substrate 9, the more the voltage at which the mode is spray mode in which a continuous film is formed shifts toward the low voltage side. The voltage range will not substantially change.

The supply rate of the present composition to the nozzle 3 may be properly set considering the above points and is not particularly limited and is, for example, preferably from 10 to 2,000 μL/min, more preferably from 50 to 1,000 μL/min, particularly preferably from 100 to 1,000 μL/min, per nozzle. When the supply rate is at least the lower limit value of the above range, the solvent in an amount sufficient for leveling is likely to remain in the droplets be deposited on the substrate 9, and a coating film having excellent in-plane uniformity and small surface roughness is likely to be formed. Further, excellent productivity of the coating film will be obtained. When the supply rate is at most the upper limit value of the above range, the voltage applied to the nozzle 3 can be sufficiently decreased.

A method of drying the formed wet film is not particularly limited and may, for example, be a heating method using a known drying apparatus. The system, structure, etc. of the drying apparatus are not limited.

The heating conditions are not limited so long as the solvent (the high boiling point solvent, etc.) remaining in the wet film can be removed. For example, a heating temperature of from 100 to 250° C. and a heating time of from 10 to 100 minutes may be mentioned.

In such a manner, a coating film is formed on the substrate 9, whereby a coating film-provided substrate is obtained.

The thickness of the coating film (thickness after drying) may be properly set considering the application of the coating film-provided substrate, etc. and is not particularly limited, and is, for example, preferably from 0.1 to 1,000 μm, more preferably from 0.1 to 500 μm, particularly preferably from 1 to 20 μm.

As specific examples of the coating film-provided substrate, for example, an insulating water repellent layer of an EW (electro wetting) device or a protective film of an organic TFT may be mentioned.

The present production method has been described with reference to an embodiment. However, the present production method is not limited to the above embodiment, and various changes and modifications are possible within a range of the present invention.

For example, the electrospraying apparatus used in the present production method is not limited to one shown in the Figure, and various known electrospraying apparatus, such as an electrospraying apparatus as disclosed in WO2015/118983 may be used.

A mask having holes in an optional pattern formed thereon may be disposed between the nozzle 3 and the substrate 9, wherein a coating film with the pattern can be formed on the substrate 9.

Advantageous Effects

According to the present production method, by applying the present composition to the substrate using an electrospraying apparatus, a coating film-provided substrate which has a coating film containing a fluorinated polymer having an alicyclic ring, and having excellent in-plane uniformity and small surface roughness, can be produced.

Further, application using an electrospraying apparatus has various advantages. For example, since an electric field is utilized, the droplet application efficiency is high as compared with application not utilizing an electric field, and the utilization efficiency of the material such as the fluorinated polymer A is high. A coating film can be formed at room temperature under atmospheric pressure, and the apparatus structure is simple, thus leading to a low cost. Further, a thin film can be uniformly formed on an irregular surface, and a coating film having an optional shape can be formed by using a mask.

EXAMPLES

Now, the present invention will be described in detail below. However, it should be understood that the present invention is by no means restricted to such specific Examples. "%" represents "mass %" unless otherwise specified.

Among the after-described Ex. 1 to 22, Ex. 1 to 13 are Comparative Examples, and Ex. 14 to 22 are Examples of the present invention. Evaluation methods and materials used in each Ex. are shown below.

[Evaluation Methods]

(Dielectric Constant of Solvent)

It was measured by parallel plate capacitor method.

The dielectric constant was measured by using a dielectric constant meter for liquid (liquid dielectric constant meter M-870, manufactured by Nihon Rufuto Co., Ltd.) applying 10 kHz sine wave, in a room temperature environment, by charging 23 mL of a solvent (25° C.) to be measured into an electrode. As the precision, error is 2%, and reproducibility and measurement error is 0.2% (JIS C2138: 2007).

(Surface Tension of Solvent)

It was measured by plate method. Specifically, measurement method is in accordance with Testing method of wettability of glass substrate (JIS R3257: 1999), vertical plate method, at room temperature 25±5° C. under a humidity of 50±10° C. Surface tensiometer DY-300, manufactured by Kyowa Interface Science Co., Ltd. was used.

(Boiling Point of Solvent)

It was measured by equilibrium reflux boiling point testing method. Specifically, the boiling point was measured in accordance with "Non-petroleum base motor vehicle brake fluids" (JIS K2233: 1989, 7.1). The measured value is corrected as a value under standard pressure (101.325 kPa {760 mmHg}) in accordance with "Petroleum products-Determination of distillation characteristics" (JIS K2254: 1980, 3.6) and is taken as the measurement result.

(Vapor Pressure of Solvent)

The vapor pressure of a single solvent was measured by a static method. The vapor pressure of a mixed solvent was obtained by Raoult's law from the vapor pressures of the respective single solvents.

(Viscosity of Solvent)

It was measured by a cone plate viscometer at 25° C.

(Solubility of Fluorinated Polymer in Solvent)

0.85 g of the fluorinated polymer was added to 84.15 g of the solvent at 25° C. and stirred by mix rotor (manufactured by AS ONE Corporation, VMRC-5). The dissolution state of the fluorinated polymer in the solvent was visually observed.

(Solid Content)

It was calculated from the following formula.

Solid content concentration [mass %]=total mass of components other than solvent (B)/total mass of the present composition×100

Otherwise, it may be calculated in accordance with the following method.

The mass (g) of an aluminum plate is measured to four decimal places, and 1.0 g (measured to four decimal places) is weighed on the aluminum plate. An oven is heated to 180° C., and after a temperature of 180° C. is reached, the sample together with the aluminum plate is put in the oven and dried in steady operation for 3 hours. Then, the aluminum plate is taken out from the oven, its mass is measured (to four decimal places), and the respective measured values are assigned to the following formula to calculate the solid content concentration.

Solid content concentration [mass %]=(mass of aluminum plate after drying sample−mass of aluminum plate)/mass of sample before drying×100

(Discharge Property)

To evaluate discharge property, an electrospraying apparatus (manufactured by Fuence Co., Ltd., ES-2000) having the structure as shown in in the Figure was used. As the nozzle 3, a nozzle having an inner diameter of 0.52 mm was used. A substrate 9 was placed on a counter electrode 5 of the electrospraying apparatus, the composition was supplied to the nozzle 3 at a supply rate (flow rate) of 1,100 µL/min, and a voltage of 18 V was applied to between the nozzle 3 and the counter electrode 5. As the substrate 9, a glass substrate having a thickness of 1 mm was used, and the distance between the tip of the nozzle 3 and the surface of the substrate 9 was 6 cm.

As to whether the composition was discharged from the nozzle 3 (whether the jet was generated or not by Coulomb explosion at the tip of the nozzle 3) when a voltage was applied was observed. In a case where the composition was discharged, the stability of discharge was evaluated based on the following standards. Stable: droplets in a jet repel one another by Coulomb's force, and as splitting into microfine droplets by evaporation of the solvent proceeds, they fly in a spray form, and unstable: although a jet is generated, the droplets will not fly in a spray form but in a form of about 2 to about 10 threads (mutijet). From these results, the discharge property was evaluated based on the following standards.

⊚ (excellent): The composition was stably discharged and applied in an circular form.

◯ (good): The composition was stably discharged but applied in a distorted shape.

Δ (acceptable): The composition was discharged but unstable.

x (unacceptable): The composition was not discharged (merely fell from the nozzle 3).

(Film-Forming Property 1 (in-Plane Uniformity))

With respect to the coating film formed on the substrate in each Ex., the dispersion of the thickness at optional 5 points in a 10 cm×10 cm region was measured by a contact film thickness meter (DEKTAK, model Dektak XT, manufactured by BRUKER) and evaluated based on the following standards.

◯ (good): The dispersion of the thickness is less than 10%.

Δ (acceptable): The dispersion of the thickness is at least 10% and less than 30%.

x (unacceptable): The dispersion of the thickness is at least 30% and less than 100%.

(Film-Forming Property 2 (Surface Roughness))

With respect to the coating film formed on the substrate in each Ex., the arithmetic mean roughnesses (Ra) on optional 5 points in a 10 cm×10 cm region were measured by a contact film thickness meter (DEKTAK, model Dektak XT, manufactured by BRUKER) in accordance with JIS B0601: 2013 (Geometrical Product Specifications (GPS)-Surface texture: Profile method-Terms, definitions and surface texture parameters), and the surface roughness was evaluated from the average value of these values based on the following standards. As the Ra measurement conditions, the standard length was 8 mm, and the evaluation length was 40 mm.

◯ (good): Average of Ra is less than 30 nm.

Δ (acceptable): Average of Ra is at least 30 nm and less than 100 nm.

x (unacceptable): Average of Ra is at least 100 nm.

[Materials]

As the fluorinated polymer A, a polymer which is a homopolymer formed by cyclopolymerization of perfluoro (3-butenyl vinyl ether) and has COOH as a main chain terminal group was used. The fluorinated polymer was obtained by removing the solvent from CYTOP CTL-809A (tradename, manufactured by Asahi Glass Company, Limited).

Solvents used in the following Ex. 1 to 22 are shown in Tables 1 and 2.

TABLE 1

| Solvent | Compound | Manufacturer | Structural formula | Dielectric constant | Surface tension [mN/m] |
|---|---|---|---|---|---|
| X1 | heptacosafluorotributylamine [tradename: CT-Solv 180] | Asahi Glass Company, Limited | (structure of heptacosafluorotributylamine) | 1.94 | 16 |
| X2 | 1,1,2,2,3,3,4,4,4a,4b,5,5,6,6,7,7,8,8,8a,9,9,10,10,10a-tetracosafluorophenanthrene | F2 Chemicals Limited | (structure of perfluorophenanthrene) | 2.01 | 19 |
| X3 | 1,1,2,2,3,3,4,4,4a,4b,5,5,6,6,7,7,8,8,8a,9,9,9a-docosafluorofluorene | F2 Chemicals Limited | (structure of perfluorofluorene) | 1.99 | 19.7 |
| X4 | 1,1,2,2,3,3,4,4,4a,5,5,6,6,7,7,8,8a-heptadecafluorodecahydro-8-(trifluoromethyl)naphthalene | F2 Chemicals Limited | (structure of perfluoro-methyldecahydronaphthalene) | 1.97 | 18.5 |
| X5 | perfluorotripentylamine | 3M | (structure of perfluorotripentylamine) | 1.98 | 18 |

| Solvent | Boiling point [°C] | Vapor pressure [Pa] | Viscosity (25°C) [mPa·s] | Solubility of fluorinated polymer | Discharge property | Molecular weight | F content [%] |
|---|---|---|---|---|---|---|---|
| X1 | 174 | 173 (25°C) | 5.2 | Soluble | x | 671.2 | 76.4 |
| X2 | 215 | 300 (25°C) | 28.4 | Soluble | x | 624.11 | 73.1 |
| X3 | 194 | 300 (25°C) | 9.58 | Soluble | x | 574 | 72.8 |
| X4 | 160 | 300 (25°C) | 6.41 | Soluble | x | 512 | 74.2 |
| X5 | 215 | 15 (25°C) | 24 | Soluble | x | 821.11 | 76.4 |

TABLE 2

| Solvent | Compound | Manufacturer | Structural formula | Dielectric constant | Surface tension [mN/m] |
|---|---|---|---|---|---|
| Y1 | 1,1,1,2,3,4,4,5,5,5-decafluoro-3-methoxy-2-(trifluoromethyl)pentane [tradename: CT-Solv 100E] | Asahi Glass Company, Limited | (structure shown) | 6.12 | 15 |
| Z1 | hexafluoro-2-propanol (HFIP) | Central Glass Co., Ltd. | (structure shown) | 18.3 | 16.8 |
| Z2 | 2,2,2-trifluoroethanol (TFEO) | Asahi Glass Company, Limited | (structure shown) | 26.9 | 17.2 |
| Z3 | 2,2,3,3,3-pentafluoro-1-propanol (5FP) | DAIKIN INDUSTRIES, LTD. | (structure shown) | 18.7 | 17.7 |

| Solvent | Boiling point [°C.] | Vapor pressure [Pa] | Viscosity (25° C.) [mPa·s] | Solubility of fluorinated polymer | Discharge property | Molecular weight | F content [%] |
|---|---|---|---|---|---|---|---|
| Y1 | 98 | 5,600 (20° C.) | 1.31 | Soluble | ○ | 350.1 | 70.5 |
| Z1 | 59 | 14,700 (20° C.) | 1.698 | Slightly soluble | ⊚ | 168.1 | 67.8 |
| Z2 | 73.6 | 9,332.54 (25° C.) | 1.735 | Slightly soluble | ⊚ | 100.1 | 57.0 |
| Z3 | 81 | 1,073 (25° C.) | 3.48 | Slightly soluble | ⊚ | 150.1 | 63.3 |

[Ex. 1 to 22]

The fluorinated polymer A and the solvents as identified in Table 3 were mixed so that the solid content concentration would be 1 mass % to obtain a liquid composition.

With respect to the composition, discharge property, film-forming property 1 and film-forming property 2 were evaluated and the results are shown in Table 3.

However, in Ex. 7, since the composition became cloudy (since the fluorinated polymer A was not sufficiently dissolved), these evaluations were not conducted. Among other Ex., in Ex. in which the result of evaluation of discharge property was X, film-forming property 1 and film-forming property 2 were not evaluated.

In Table 2, X/Y/Z represents the mass ratio of the solvent X, the solvent Y and the solvent Z. The dielectric constant and the surface tension are respectively values of the solvent as a whole.

TABLE 3

| | Solvent | | | | | | | Evaluation results | | |
|---|---|---|---|---|---|---|---|---|---|---|
| Ex. | Solvent X | Solvent Y | Solvent Z | X/Y/Z (mass ratio) | Dielectric constant | Boiling point (° C.) | Surface tension (mN/m) | Discharge property | Film-forming property 1 | Film-forming property 2 |
| 1 | X1 | — | — | 100/0/0 | 1.94 | 174 | 16 | X | — | — |
| 2 | X2 | — | — | 100/0/0 | 2.01 | 215 | 19 | X | — | — |
| 3 | X3 | — | — | 100/0/0 | 1.99 | 194 | 19.7 | X | — | — |
| 4 | X4 | — | — | 100/0/0 | 1.97 | 160 | 18.5 | X | — | — |
| 5 | X5 | — | — | 100/0/0 | 1.98 | 215 | 18 | X | — | — |
| 6 | — | Y1 | — | 0/100/0 | 6.14 | 98 | 15 | Δ | X | X |
| 7 | — | — | Z1 | 0/0/100 (cloudy) | 18.3 | 59 | 16.8 | — (⊚ with solvent alone) | — | — |
| 8 | X1 | Y1 | — | 40/60/0 | 4.46 | — | 15.4 | Δ | X | Δ |
| 9 | X1 | Y1 | — | 50/50/0 | 4.04 | — | 15.5 | X | — | — |
| 10 | X1 | Y1 | — | 60/40/0 | 3.62 | — | 15.6 | X | — | — |
| 11 | — | Y1 | Z1 | 0/87/13 | 7.72 | — | 15.2 | ○ | X | X |
| 12 | X1 | — | Z1 | 87/0/13 | 4.07 | — | 16.1 | X | — | — |
| 13 | X1 | — | Z1 | 83/0/17 | 4.72 | — | 16.1 | Δ | X | Δ |
| 14 | X1 | Y1 | Z1 | 38/57/5 | 5.15 | — | 15.5 | ○ | Δ | Δ |

TABLE 3-continued

| | Solvent | | | | | | Evaluation results | | |
|---|---|---|---|---|---|---|---|---|---|
| Ex. | Solvent X | Solvent Y | Solvent Z | X/Y/Z (mass ratio) | Dielectric constant | Boiling point (° C.) | Surface tension (mN/m) | Discharge property | Film-forming property 1 | Film-forming property 2 |
| 15 | X1 | Y1 | Z1 | 35/52/13 | 6.25 | — | 15.6 | ○ | ○ | ○ |
| 16 | X1 | Y1 | Z1 | 52/35/13 | 5.54 | — | 15.8 | ○ | Δ | Δ |
| 17 | X1 | Y1 | Z2 | 35/52/13 | 6.31 | — | 15.7 | ○ | ○ | ○ |
| 18 | X1 | Y1 | Z3 | 35/52/13 | 7.38 | — | 15.6 | ○ | ○ | ○ |
| 19 | X2 | Y1 | Z1 | 35/52/13 | 5.57 | — | 15.9 | ○ | Δ | Δ |
| 20 | X3 | Y1 | Z1 | 35/52/13 | 5.55 | — | 16.0 | ○ | Δ | Δ |
| 21 | X4 | Y1 | Z1 | 35/52/13 | 5.56 | — | 15.8 | ○ | Δ | Δ |
| 22 | X5 | Y1 | Z1 | 35/52/13 | 5.6 | — | 15.7 | ○ | Δ | Δ |

In Ex. 1 to 5, 8 to 10 and 12 to 13, in which the solvent had a dielectric constant of less than 5, the composition could not be discharged, or was unstable even if it could be discharged, and the resulting coating film had insufficient in-plane uniformity. In Ex. 6 in which the solvent contained only the solvent Y and did not contain a high boiling point solvent, the composition was discharged unstably, and the resulting coating film had insufficient in-plane uniformity and large surface roughness. In Ex. 7 in which the solvent contained only the solvent Z and did not contain a high boiling point solvent, the fluorinated polymer A was not sufficiently dissolved in the solvent. In Ex. 11 in which the solvent was a mixed solvent of the solvent Y and the solvent Z and did not contain a high boiling point solvent, the composition was favorably discharged, but the resulting coating film had insufficient in-plane uniformity and large surface roughness.

Whereas the composition in each of Ex. 14 to 22 could be stably discharged, and a coating film having excellent in-plane uniformity and small surface roughness could be formed.

INDUSTRIAL APPLICABILITY

The coating film formed from the composition of the present invention, which contains the fluorinated polymer A, is excellent in heat resistance, chemical resistance, water repellency, weather resistance, electrical insulating properties, optical properties, non-stickiness, low frictional properties, flame retardancy, etc. and by virtue of such characteristics, it is used in various fields such as chemical, electrical/electric, semiconductor, building and automobile fields. It may be used, for example, as a gate insulating film or a protective film of an organic TFT, an insulating water repellent film or a protective film of an electric device such as EW device, or a water and oil repellent film.

This application is a continuation of PCT Application No. PCT/JP2017/035869, filed on Oct. 2, 2017, which is based upon and claims the benefit of priority from Japanese Patent Application No. 2016-197365 filed on Oct. 5, 2016. The contents of those applications are incorporated herein by reference in their entireties.

REFERENCE SYMBOLS

1: Electrospraying apparatus, 3: nozzle, 5: counter electrode, 7: power source, 9: substrate, 11: supply pipe, 13: cable, 15: cable.

What is claimed is:

1. A composition comprising a fluorinated polymer having an alicyclic ring, and a solvent, wherein the solvent has a dielectric constant of at least 5 and comprises a solvent X which is a perfluoro compound, a solvent Y which is at least one of a hydrofluorocarbon and a hydrofluoroether, and a solvent Z which is a fluorinated alcohol, and
   at least one of the solvent X, the solvent Y, and the solvent Z has a boiling point of at least 150° C.,
   wherein the solvent has a surface tension of from 15.5 to 16.0 mN/m.

2. The composition according to claim 1, wherein the fluorinated polymer has an alicyclic ring in its main chain.

3. The composition according to claim 2, wherein the fluorinated polymer having an alicyclic ring in its main chain is formed by cyclopolymerization of a cyclopolymerizable diene fluorinated monomer, or
   comprises polymerized units of a monomer having a fluorinated alicyclic ring and a polymerizable double bond between carbon atoms constituting the ring of the alicyclic ring or a polymerizable double bond between a carbon atom constituting the ring of the alicyclic ring and a carbon atom not constituting the ring.

4. The composition according to claim 1, wherein the solvent X has a dielectric constant of less than 5.

5. The composition according to claim 1, wherein at least one of the solvent Y and the solvent Z has a boiling point of less than 150° C.

6. The composition according to claim 1, wherein the solvent X has a boiling point of at least 150° C.

7. The composition according to claim 1, wherein the solvent X is at least one member selected from the group consisting of a perfluorotrialkylamine and a perfluoroalicyclic compound.

8. The composition according to claim 1, wherein the solvent X is at least one member selected from the group consisting of heptacosafluorotributylamine, perfluorotripentylamine, 1,1,2,2,3,3,4,4,4a,4b,5,5,6,6,7,7,8,8,8a,9,9,10,10,10a-tetracosafluorophenanthrene, 1,1,2,2,3,3,4,4,4a,4b,5,5,6,6,7,7,8,8,8a,9,9,9a-docosafluorofluorene and 1,1,2,2,3,3,4,4,4a,5,5,6,6,7,7,8,8a-heptadecafluorodecahydro-8-(trifluoromethyl)naphthalene.

9. The composition according to claim 1, wherein the solvent Y is at least one member selected from the group consisting of 1,1,1,2,2,3,3,4,4,5,5,6,6-tridecafluorohexane, 1,1,1,2,2,3,3,4,4,5,5,6,6-tridecafluorooctane and 1,1,1,2,3,4,4,5,5,5-decafluoro-3-methoxy-2-(trifluoromethyl)pentane.

10. The composition according to claim 1, wherein the solvent Z is at least one member selected from the group consisting of hexafluoro-2-propanol, 2,2,2-trifluoroethanol, 2,2,3,3,3-pentafluoro-l-propanol, 1,1,2,2-tetrafluoroethyl 2,2,2-trifluoroethyl ether, 2,2,3,3-tetrafluoropropanol, 2,2,3,3,4,4,5,5-octafluoro-1-pentanol and 1H,1H,2H,2H-tridecafluoro-1-n-octanol.

11. The composition according to claim 1, wherein based on a total mass of the solvent X, the solvent Y and the solvent Z, the content of the solvent X is from 35 to 60 mass %, the content of the solvent Y is from 35 to 60 mass %, and the content of the solvent Z is from 5 to 30 mass %.

12. A method for producing a film-provided substrate, which comprises
applying the composition as defined in claim 1 to a substrate by an electrospraying apparatus, and removing the solvent to form a film containing the fluorinated polymer thereby forming the film-provided substrate.

13. The composition according to claim 1, wherein the mass ratio of solvent X:solvent Y:solvent Z is 35-52:35-57:5-13.

14. The composition according to claim 1, wherein the solvent has a dielectric constant of from 5.15 to 7.38.

15. The composition according to claim 1, wherein:
the solvent X has a dielectric constant of less than 5 and a boiling point of at least 150° C.;
at least one of the solvent Y and the solvent Z has a boiling point of less than 150° C.;
the mass ratio of solvent X:solvent Y:solvent Z is 35-52:35-57:5-13; and
the solvent has a dielectric constant of from 5.15 to 7.38.

16. A composition comprising a fluorinated polymer having an alicyclic ring, and a solvent, wherein the solvent has a dielectric constant of at least 5 and comprises a solvent X which is a perfluoro compound, a solvent Y which is at least one of a hydrofluorocarbon and a hydrofluoroether, and a solvent Z which is a fluorinated alcohol, and
at least one of the solvent X, the solvent Y, and the solvent Z has a boiling point of at least 150° C., wherein
the solvent X is at least one selected from the group consisting of heptacosafluorotributylamine; 1,1,2,2,3,3,4,4,4a,4b,5,5,6,6,7,7,8,8,8a,9,9, 10,10,10a-tetracosafluorophenanthrene; 1,1,2,2,3,3,4,4,4a,4b,5,5, 6,6, 7, 7,8,8,8a,9,9,9a-docosafluorofluorene; 1,1,2,2,3,3,4, 4,4a,5,5,6,6,7,7,8,8a-heptadecafluorodecahydro-8-(trifluoromethyl)naphthalene; and perfluorotripentylamine,
the solvent Y is 1,1,1,2,3,4,4,4,5,5,5-decafluoro-3-methoxy-2-(trifluoromethyl)pentane, and
the solvent Z is at least one selected from the group consisting of hexafluoro-2-propanol (HFIP); 2,2,2-trifluoroethanol (TFEO); and 2,2,3,3,3-pentafluoro-1-propanol.

17. The composition according to claim 16, wherein
the mass ratio of solvent X:solvent Y:solvent Z is 35-52:35-57:5-13;
the solvent has a dielectric constant of from 5.15 to 7.38; and
the solvent has a surface tension of from 15.5 to 16.0 mN/m.

18. The composition according to claim 16, wherein the fluorinated polymer has an alicyclic ring in its main chain.

19. The composition according to claim 18, wherein the fluorinated polymer having an alicyclic ring in its main chain is formed by cyclopolymerization of a cyclopolymerizable diene fluorinated monomer, or
comprises polymerized units of a monomer having a fluorinated alicyclic ring and a polymerizable double bond between carbon atoms constituting the ring of the alicyclic ring or a polymerizable double bond between a carbon atom constituting the ring of the alicyclic ring and a carbon atom not constituting the ring.

20. The composition according to claim 16, wherein based on a total mass of the solvent X, the solvent Y and the solvent Z, the content of the solvent X is from 35 to 60 mass %, the content of the solvent Y is from 35 to 60 mass %, and the content of the solvent Z is from 5 to 30 mass %.

21. A method for producing a film-provided substrate, which comprises
applying the composition as defined in claim 16 to a substrate by an electrospraying apparatus, and removing the solvent to form a film containing the fluorinated polymer thereby forming the film-provided substrate.

22. The composition according to claim 16, wherein the mass ratio of solvent X:solvent Y:solvent Z is 35-52:35-57:5-13.

23. The composition according to claim 16, wherein the solvent has a dielectric constant of from 5.15 to 7.38.

24. The composition according to claim 16, wherein the solvent has a surface tension of from 15.5 to 16.0 mN/m.

* * * * *